United States Patent [19]

Albert et al.

[11] Patent Number: 4,570,049
[45] Date of Patent: Feb. 11, 1986

[54] BAND WELDING INSTALLATION FOR JOINING PLATES, SHEET BARS, AND BANDS

[75] Inventors: Hans-Joachim Albert, Hofheim-Lorsbach; August Böhm, Kelkheim, both of Fed. Rep. of Germany

[73] Assignee: Oxytechnik GmbH, Fed. Rep. of Germany

[21] Appl. No.: 500,888

[22] Filed: Jun. 3, 1983

[30] Foreign Application Priority Data

Jul. 7, 1982 [DE] Fed. Rep. of Germany ....... 3225341

[51] Int. Cl.$^4$ .............................................. B23K 9/12
[52] U.S. Cl. ........................... 219/124.34; 219/124.22; 219/124.1; 219/124.33
[58] Field of Search ........... 219/124.1, 124.22, 124.33, 219/125.1, 124.34, 124.4

[56] References Cited

U.S. PATENT DOCUMENTS

| | | | |
|---|---|---|---|
| 3,017,496 | 1/1962 | Greene | 219/124.22 |
| 3,484,667 | 12/1969 | Wofsey | 219/124.34 X |
| 4,242,620 | 12/1980 | Fujiwara et al. | 219/124.22 X |
| 4,296,306 | 10/1981 | Nomura et al. | 219/124.34 |
| 4,400,610 | 8/1983 | Murakami et al. | 219/124.34 X |

FOREIGN PATENT DOCUMENTS 0713666  2/1980  U.S.S.R. .......................... 219/124.34

Primary Examiner—C. L. Albritton
Assistant Examiner—Catherine M. Sigda
Attorney, Agent, or Firm—Connolly and Hutz

[57] ABSTRACT

A band welding installation includes a welding machine having a control device and a welding torch for joining ends of pieces in a band processing line transverse to the direction of the band run. At least two sensor units are coupled ahead of the torch for determining the seam beginning and end, and for guiding the torch along the joint center, as well as controlling the torch angle of inclination for different band thicknesses.

9 Claims, 4 Drawing Figures

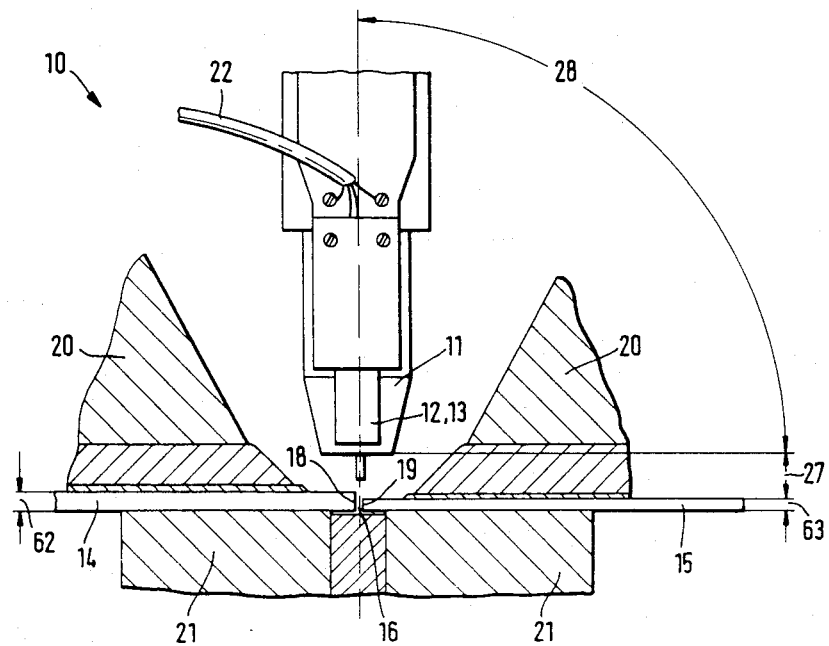
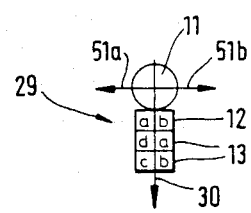
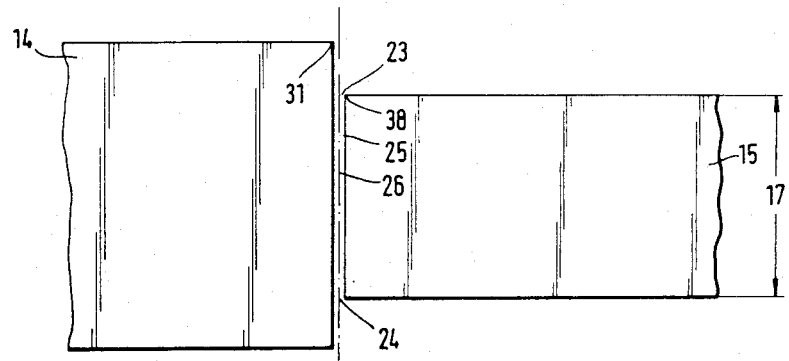
FIG. 1A
FIG. 1B

BAND WELDING INSTALLATION FOR JOINING PLATES, SHEET BARS, AND BANDS

BACKGROUND OF INVENTION

The invention concerns a band welding installation or strip welding plant for joining band ends in a processing line transverse to the direction of the band run. In band welding installations, bands of any given length are produced by welding together plates, sheet bars, bands for continuous processing in rolling mills or operations processing the material in rolling bands. Thereby, high demands are placed on the welding joints in respect to tensile and transverse stress. Thus, the welding seam must be free of pores and penetration notches, must have a root face that is well and evenly welded, and must be possible to roll out.

When running through annealing installations, the welding seam itself must be secure even at high annealing temperatures, even though bands of different material qualities, widths, and thicknesses may have been joined.

A combined band welding installation with remote control is known, which is distributed by the company Oxytechnik under the name of Kontinumat. For producing a constant welding slot, this known installation has a built-in cutter with double cutting action which hydraulically activated, cuts the beginning and the end of the band simultaneously. Thereby, the band ends are fixed and clamped down in position by means of combined gripping and clamping units. Due to the combination of the double-action cutter with the gripping and clamping device in one machine, there is no drift travel of the free band after the cutting. Soiling of and damage to the cut ends of the band cannot occur. Since both ends of the band are cut simultaneously, the cut ends (welding seam ends) are mirror images of one another. During the cutting, the jaws of the gripping device serve to hold the band down. After the cutting, the band ends are clamped into the clamping bar and are joined in that manner for welding. Thereby, the combination of cutting and joining take place automatically by remote control. Only the welding is initiated by hand. Here, manual correction of the initial position is necessary if the rapid start of the chassis with the welding torch is not precise. The same applies in case of a centering and/or elevation deviation of the welding torch. Consequently, the obtained quality of the welding seam depends on the professional qualifications and the observation and reaction capabilities of the person executing this action.

SUMMARY OF INVENTION

The object of the invention is to create a band welding installation with automatic processing, by means of which it is possible to obtain both uniform and reproducible welding quality.

In a device of this type, this problem is solved by at least two sensor units which determine the beginning and end of the seam and which guide the torch along the joint center, as well as controlling its angle of inclination. Advantageously, the one sensor unit is developed as a magnet head and the other sensor unit as an inductive or capacitive device for measuring elevation. On the one hand, the advantages achieved with the invention consist therein that an automatic process is generated in the band welding installation and on the other hand the conditions for uniform and reproducible weld quality as well as potential for remote control of the installation can be achieved.

THE DRAWINGS

FIGS. 1A and 1B are a schematic representations of the welding area of the band welding installation, in front view and top view, respectively; and FIGS. 2 and 3 are electrical block diagrams of the control of the seam sensing.

DETAILED DESCRIPTION

Figure 2:
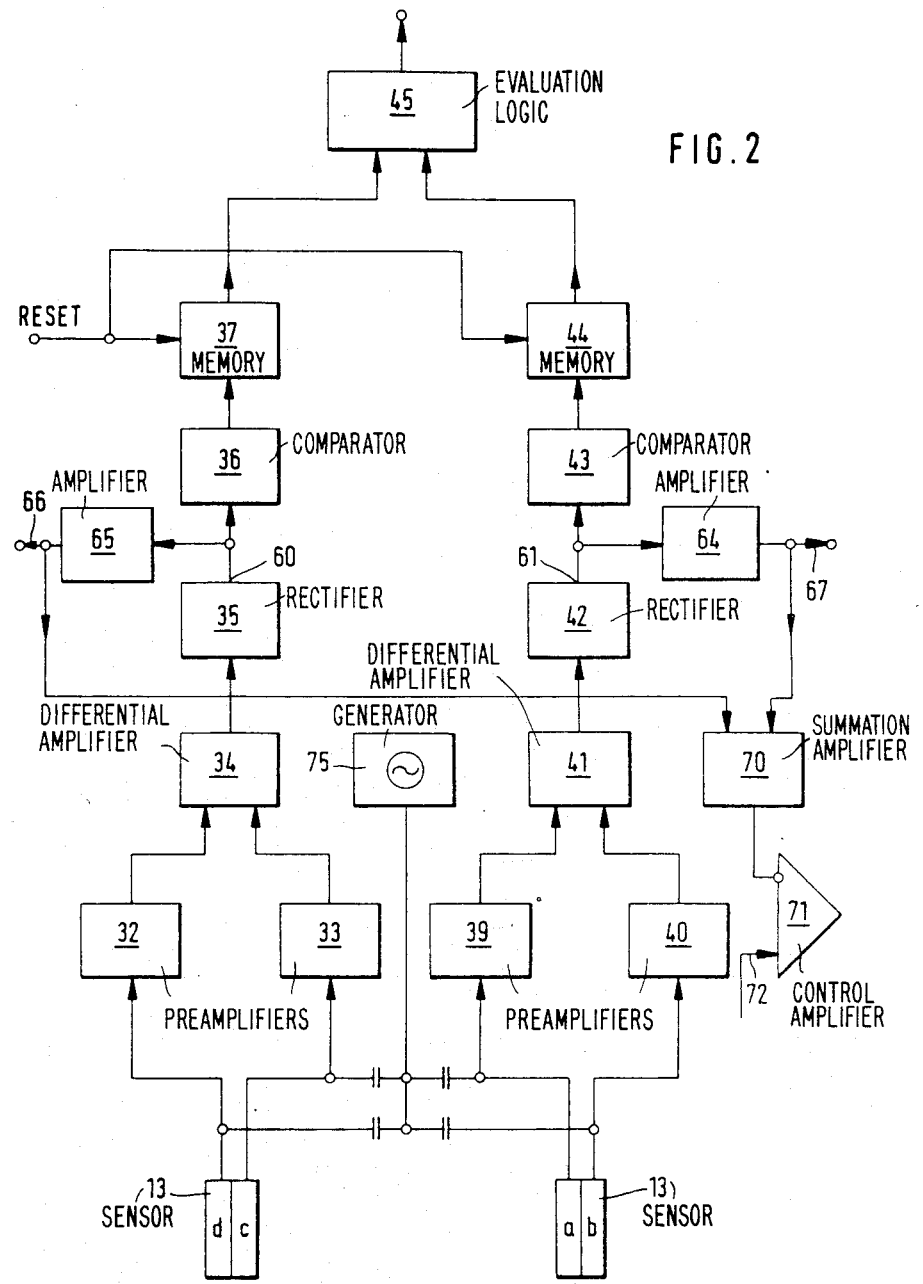

In FIG. 1, one part of a band welding installation or strip welding plant is identified as 10. Basically, the band welding installation 10, which is shown schematically only, consists of a welding torch 11, at least two sensor units 12, 13 connected with the welding torch 11, and a clamping device, which is only schematically represented. In the illustrated example, the band ends 14, 15, which are clamped into the band welding installation 10, are located in a so-called straight joint in relation to one another, whereby, for the sake of clarity only, the distance, i.e., the slot between the two bands 14 and 15, has been shown as being relatively great. In actuality, this slot 16 amounts to from 0 to approximately 3 mm.

The progression of the slot 16 over the welding seam length 17, formed by bands 14 and 15, are occasionally of different widths, and will then have mirror-image adjoining welding material ends 18 and 19, which have been produced by the cut of a cutter with double-cutting action. Thereby, the bands 14 and 15 are held down and held in position by means of gripping jaws 20 and clamping jaws 21, during both cutting and welding. The tightening of the gripping and clamping jaws 20, 21, is achieved by means of hydraulic cylinders, which are not shown. The welding torch 11, which is only shown schematically, is preferably developed as a protective gas welding torch, and coupled in series behind the sensor units 12, 13. The sensor units 12, 13 are connected via a control cable 22 with a control unit shown in greater detail in FIGS. 2 and 3. Furthermore, the welding torch 11 and the sensor units 12, 13 are connected with adjustment and drive devices which are not represented in detail. The sensor units 12, 13 are connected in series ahead of the welding torch 11 for purposes of determining the seam beginning 23 and the seam end 24 as well as for transversal search of the joint 25, guidance to the joint center 26 and constant vertical distance 27, as well as preferably for inclining the torch 11 at an angle 28 for connection of bands of different thickness. The function of the band welding installation 10 according to the invention will be described in particular with reference to the electrical block switching diagrams according to FIGS. 2 and 3.

The determination of the seam beginning 23 and the seam end 24 is described in the following with reference to FIG. 2.

After the start signal, the welding torch 11 and the sensor units 12, 13 move from a defined parking position 29 in the direction of the arrow 30 (FIG. 1). Thereby, when the edge 31 is reached, the sensor portions 13c, 13d first emit a signal to the subsequent preamplifiers 32, 33 and generate a difference signal in the difference amplifier 34. This signal is led via a rectifier 35 to a comparator 36 which triggers a first memory 37. The signal "seam beginning 23" via the evaluation logic 45 is not given until the second memory 44 has been activated over the edge 38 by means of sensor portions 13a, 13b as well as a parallel signal path (preamplifiers 39, 40 difference amplifier 41, rectifier 42, comparator 43). The torch/sensor movement is halted when the welding torch 11 has reached the edge 38. The determination of the seam end 24 takes place in a similar way by resetting of the memories 37, 44.

A generator 75 constitutes the power supply for the sensor unit 13.

Figure 3:
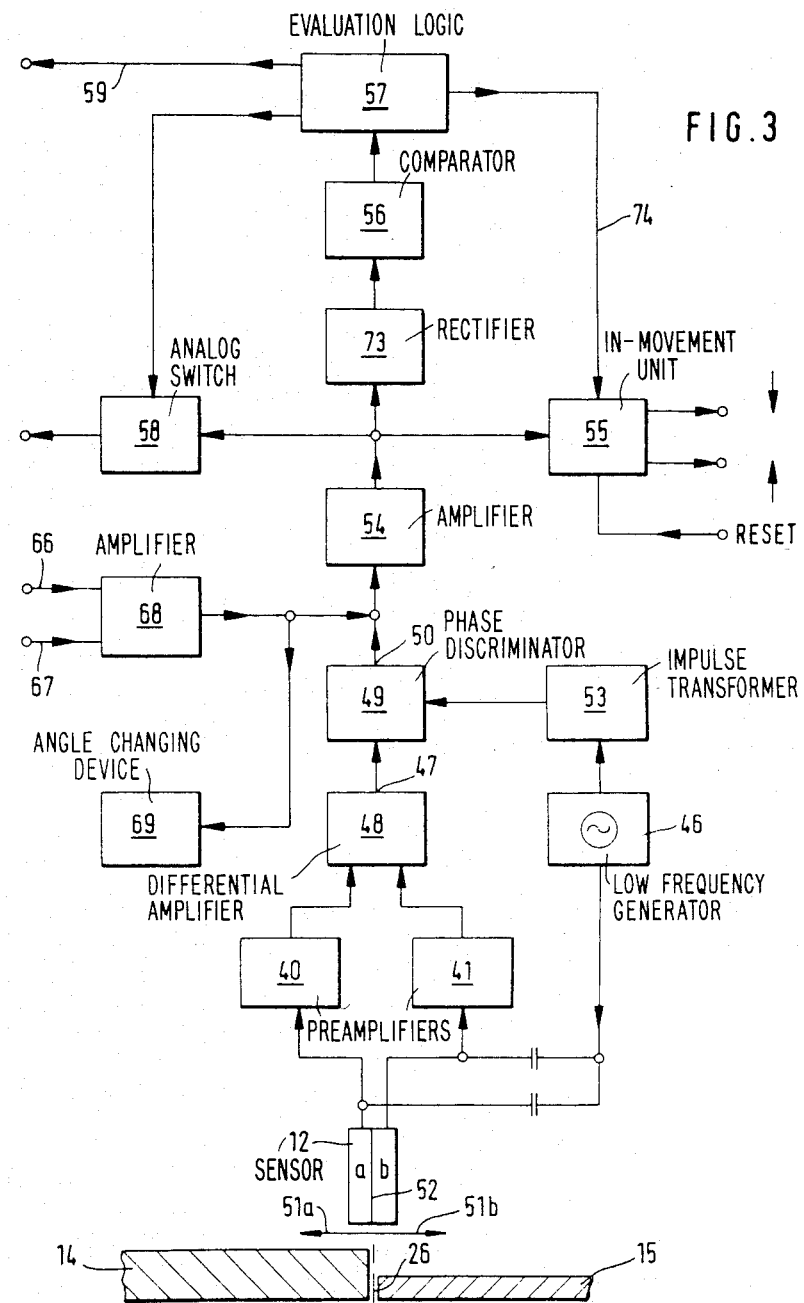

The device for guiding the welding torch 11 to the joint center 26 is illustrated in FIG. 3. The guiding device has a low frequency generator 46 which supplies the sensor unit 12. With a symmetrical arrangement of the sensor portions 12a, 12b over the joint center 26, no signal is generated at the output 47 of the difference amplifier 48, this due to identical symmetrical damping of the sensor portions 12a, 12b. The phase discriminator 49 delivers no voltage at the output 50, so that no transversal setting command (double arrow direction 51) arrives to the torch positioning device, which is not shown on the drawing. If the axis 52 of the sensor unit 12 is not located above the joint center 26, i.e., if the sensor portions 12a, 12b are dislocated to the right or to the left in relation to the joint center 26, different voltages are induced due to mistuning of the sensor portions 12a, 12b in relation to one another. At the output 47 of the difference amplifier 48, a differential voltage occurs between the individual voltages induced in the sensor portions 12a, 12b. This differential voltage is a direct measure of the deviation from the joint center 26 of the torch 11, which is connected with the sensing unit. If there is a deviation to the right or the left from the joint center 26, this is determined in a phase discriminator 49 by indirect comparison between, on one hand, the phase position of the voltage supplied from the low frequency generator 46 as generated over an impulse transformer 53, and, on the other hand, the voltage supplied from the difference amplifier 48. According to the phase position of the output signal from the difference amplifier 48, there will be positive or negative voltage at the output 50 of the discriminator 49. The magnitude of the dislocation is a measure of the deviation from the seam center, the phase position is a measure of the direction of this deviation. Consequently, a signal is generated behind the amplifier 54, the polarity of which signal indicates the direction of the deviation and its elevation in proportion to the deviation from the center.

For locating the joint center 26 starting from the position of the welding torch 11 over the edge 38, the signal from the discriminator 49 is led via the amplifier 54 to a comparator provided in an automatic in-movement unit 55, whereby the transversal movement 51a towards the joint center 26 is triggered. When the joint center 26 has been reached, a comparator 56 is activated by means of intermediate switching of a rectifier 73. The transversal movement of the welding torch 11 is stopped by the evaluation logic 57 (line 74), and an analog switch 58 releases the control signal for continuous further adjustment of the welding torch 11 to the joint center 26 during the welding as well as the welding process, namely over line 59 (forward movement of the torch in the direction of the arrow 30).

The device that has been described in the foregoing is sufficient for sensing of completely even work pieces. When the surfaces of the band ends 14 and 15 are uneven (e.g., different band thicknesses 62, 63 in FIG. 1), asymmetrical signals will occur in the execution example according to FIG. 2, namely at the outputs 60, 61 of the rectifiers 35, 42 which signals will cause the welding torch 11 to deviate from the joint center 26. In order to avoid this, these signals are led to the difference amplifier 68 in FIG. 3, namely via amplifiers 64, 65 and lines 66, 67.

The output signal of the amplifier 68 is led to the amplifier 54 as a correction signal, and the welding torch 11 is thereby brought back to the joint center 26 and kept there.

Further, the output signal of the difference amplifier 68 can advantageously be led to a device 69 for changing the angle 28 of the welding torch 11, so that the torch 11 can be inclined within the range from 70° to 80° of the angle 28 depending on the magnitude of the signal.

In order to maintain a preselected vertical distance 27 of the welding torch/sensor unit 11, 12, 14, the signals from the amplifiers 64, 65 are led to the summation amplifier 70, the output signal of which is proportional to the sum of the distances of the sensor portions 13c, 13d to 13a, 13b. The output signal of the summation amplifier 70 is led via a control amplifier 71 with a nominal value input 72 to an adjustment device for the torch elevation, which device is not shown in detail.

When the welding torch/sensor unit 11, 12, 13 reaches the area of the seam end 24, the signals of the sensor portions 13b, 13a will disappear, and the memory 44 is erased, so that no more signal is given to the evaluation logic. Over internal circuits in the evaluation logic 45, the welding torch 11 is moved an additional, defined distance, so that it is ascertained that the seam is completely welded. Thereafter, the evaluation logic 45 generates signals to discontinue the welding process, to return the welding torch/sensor 11, 12, 13 to the parking position, and also, via the "reset" lines, to return the memories 37, 44 and 55 to zero.

SUMMARY

The invention concerns a band welding installation 10 for joining plates, sheet bars, and bands, such as finished rolled plate pieces, prerolled plates and sheet bars, coils, and/or welding ends in a processing line transversal to the direction of the band run, with a welding machine, a control device, and a welding torch 11.

In order to create an automated process in a band welding machine, by means of which process it is possible to obtain uniform as well as reproducible quality of the welding, at least two sensor units 12, 13 are coupled ahead of the welding torch 11 of the band welding machine 10, namely in order to determine the seam beginning 23 and the seam end 24 and to transversally search the joint 25, guide the torch to the joint center 26 and to a constant vertical distance 27 and preferably also to incline the torch 11 at an angle 28 when different band thicknesses 62, 63 are to be joined (FIG. 1).

What is claimed is:

1. In a method for welding strip ends together in a strip welding installation by means of a welding machine having a control device and a welding torch which welds the strip ends transversely to the direction of the strip travel, the improvement being automatically controlling and non-manually executing the welding operation by coupling at least two sensor units ahead of the welding torch, and utilizing the sensor units to determine the beginning and the end of the resulting weld seam and to guide the torch at a constant vertical distance as well as to control the torch inclination when different band thicknesses are joined.

2. A strip welding installation for use in a strip processing line to selectively join plates, sheet bars, and strips, including finish-rolled pieces of plate, rough-rolled plates and sheet bars, and coils and to selectively weld on ends at right angles to the direction in which the strip runs, said welding installation comprising a welding machine having a welding torch, at least two sensor units installed in advance of the welding torch of said strip welding machine for detecting the beginning and the end of the seam and the joint in the transverse direction, and a control system responsive to the sensor units for guiding said torch to the middle of the joint at a constant vertical distance therefrom for automatically controlling and non-manually executing the welding operation.

3. A strip welding installation according to claim 2, wherein said sensor units are also for use in inclining said torch at an angle when joining strips of dissimilar thickness.

4. A strip welding installation according to claim 3, wherein one of said sensor units is in the form of a magnetic head and the other sensor unit is a height measuring device of the inductive or capacative type.

5. A strip welding installation according to claim 4, wherein the detection of the beginning and end of said seam and of said joint in the transverse direction and the guidance of said torch to the middle of said joint at a constant vertical distance therefrom are carried out automatically.

6. A strip welding installation according to claim 2, wherein one of said sensor units is in the form of a magnetic head and the other sensor unit is a height measuring device of the inductive or capacative type.

7. A strip welding installation according to claim 6, wherein the detection of the beginning and end of said seam and of said joint in the transverse direction and the guidance of said torch to the middle of said joint at a constant vertical distance therefrom are carried out automatically.

8. A strip welding installation according to claim 3, wherein the detection of the beginning and end of said seam and of said joint in the transverse direction and the guidance of said torch to the middle of said joint at a constant vertical distance therefrom are carried out automatically.

9. A strip welding installation according to claim 2, wherein the detection of the beginning and end of said seam and of said joint in the transverse direction and the guidance of said torch to the middle of said joint at a constant vertical distance therefrom are carried out automatically.

* * * * *